Figure 1:
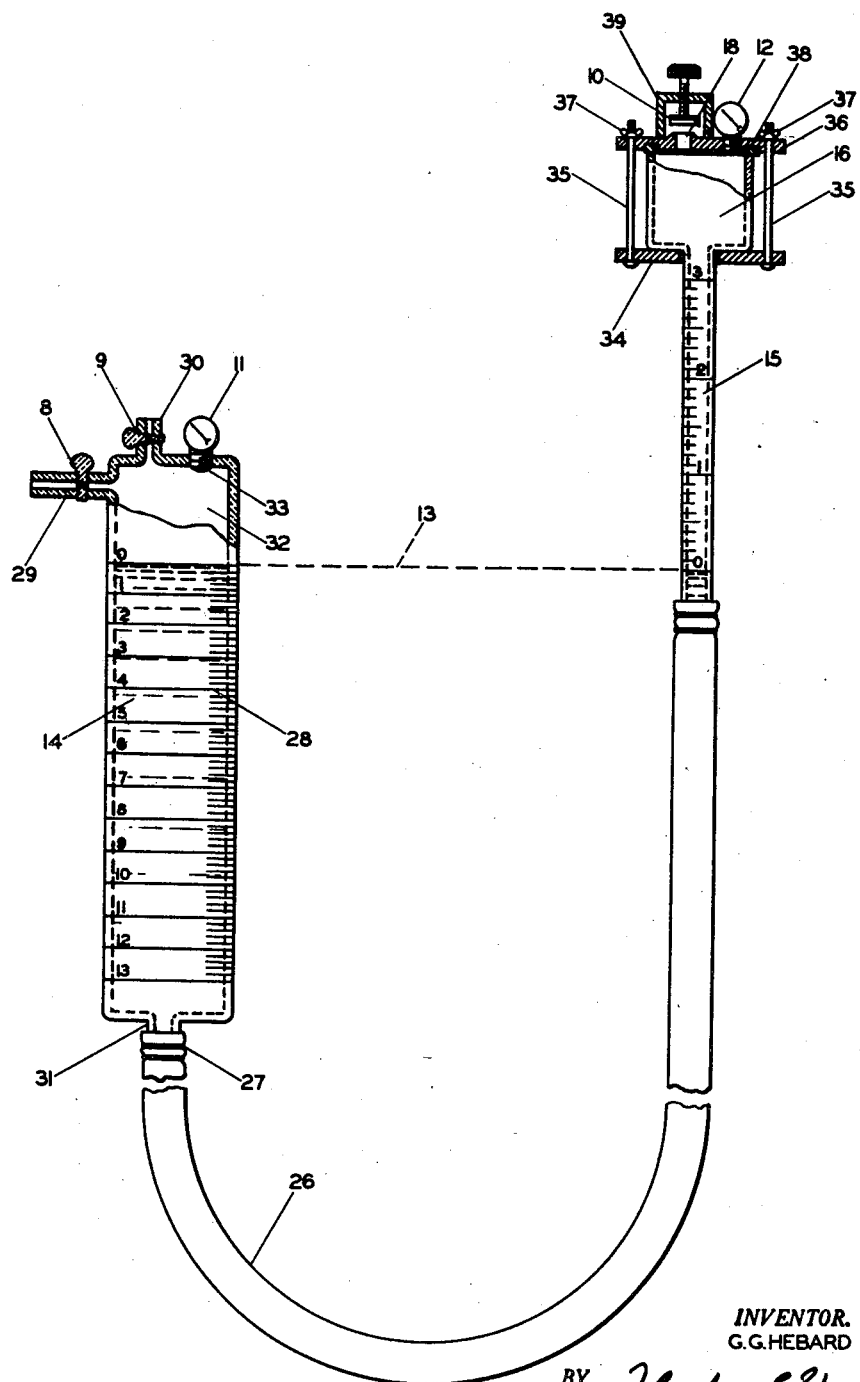

Jan. 9, 1951  G. G. HEBARD  2,537,668
POROSIMETER AND METHOD OF USING SAME
Filed April 1, 1946  2 Sheets-Sheet 1

INVENTOR.
G. G. HEBARD
BY Hudson & Young
ATTORNEYS

Jan. 9, 1951             G. G. HEBARD             2,537,668
POROSIMETER AND METHOD OF USING SAME
Filed April 1, 1946             2 Sheets-Sheet 2
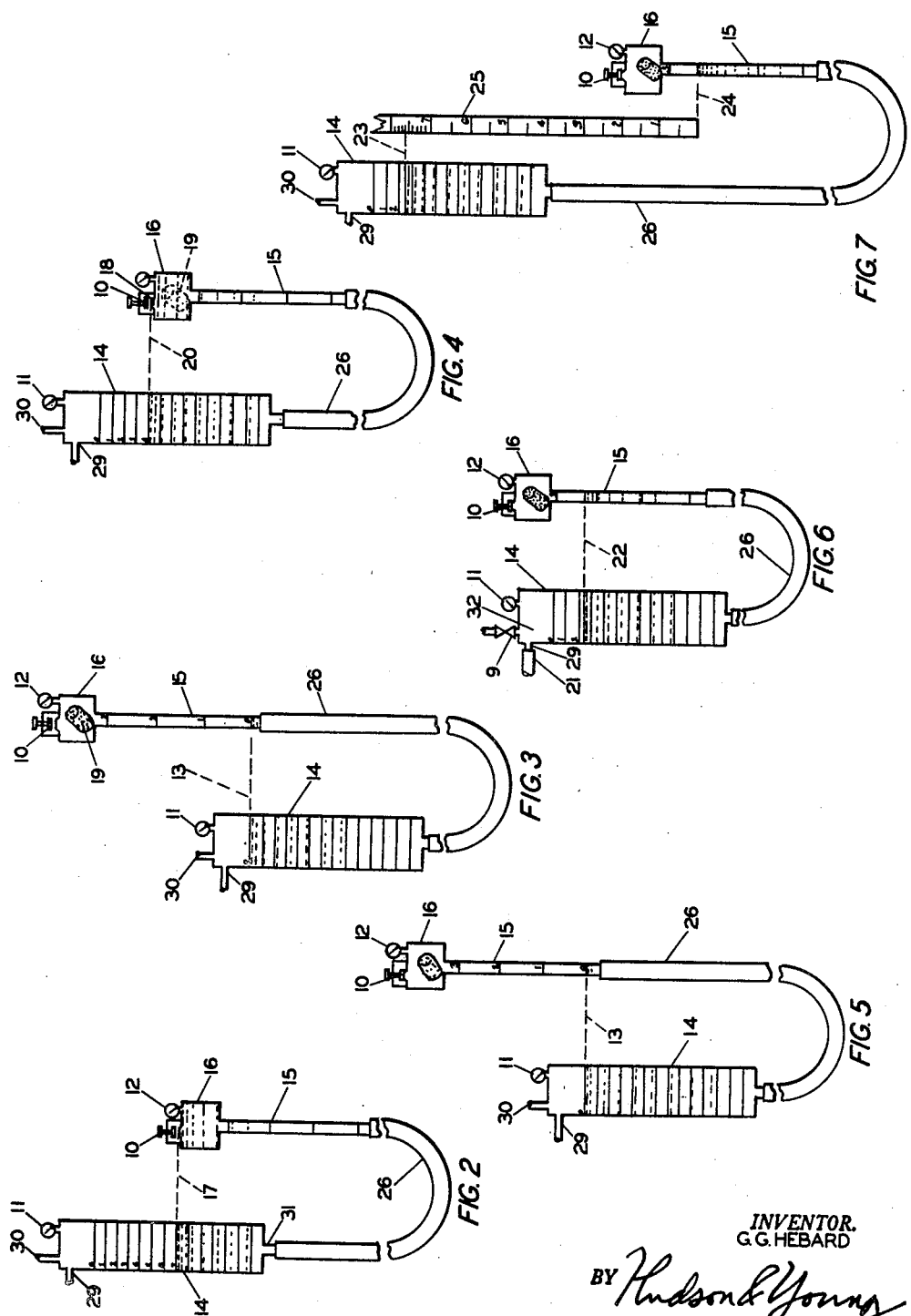
INVENTOR.
G. G. HEBARD
BY Hudson & Young
ATTORNEYS Patented Jan. 9, 1951

2,537,668

UNITED STATES PATENT OFFICE 2,537,668

POROSIMETER AND METHOD OF USING SAME

Glen G. Hebard, Bartlesville, Okla., assignor to Phillips Petroleum Company, a corporation of Delaware Application April 1, 1946, Serial No. 658,798

10 Claims. (Cl. 73—38)

This invention relates to porosimeters. In one specific aspect it relates to methods and apparatus for determining the effective porosity of core solids. In another specific aspect it relates to simple methods and apparatus involving a minimum of calculation for determining the effective core space in a sample of a consolidated earth formation by a method involving simpler calculations than are necessary in the usual hydrogen porosimeter and which method avoids contaminating the interior of the core with molten or liquid metal or other liquids or solids.

It has long been recognized as very important that careful estimates of the effective porosity of formations encountered in well drilling be made. From such estimates the flow, or lack of flow, of a producing formation (including all possible future production) may be determined.

Difficulties have been experienced in the prior art because the operations to determine the effective porosity have either involved complicated calculations involving the gas laws as corrected for imperfect gases or the sample has been contaminated and rendered unfit for further use by injecting mercury or other foreign substances into the core under high pressure. Calculations requiring the use of Van der Waals constants for gases and his equations for variations of Boyle's law are unsuited for use in the field by the ordinary oil field technician. Oil companies always like to preserve core samples for future tests and checks on the field of operations and such future tests are impossible when the core is contaminated with mercury or other substances.

The present invention, however, does not contaminate the core and operates at such pressure ranges that very simple calculations based on Boyle's law alone are sufficient, which calculations can be made by any oil field technician. It is not necessary to use special gases such as hydrogen in the present invention as atmospheric air is sufficient.

The term porosity, as used throughout this specification, refers to effective porosity, which is the only porosity of value in the determining of the future recovery of oil from the formation. Obviously certain forms of volcanic glass contain a large number of bubbles of air, which makes them quite light, but their effective porosity is nearly zero because the bubbles are not interconnected. Obviously without such interconnection the oil cannot flow out of the formation into the well, so the only porosity that concerns the oil geologists is effective porosity.

One object of the present invention is to provide methods and apparatus for determining porosity.

Another object is to provide methods and apparatus for determining porosity of samples of consolidated matter which do not contaminate the samples with mercury or other substances.

Another object is to provide methods and apparatus for measuring porosity of samples of consolidated matter without requiring the use of complicated calculations such as those involving Van der Waals constants and equations for imperfect gases.

Another object is to provide methods and apparatus suitable for rapid determination of porosity of cores in the field by the ordinary oil field technician.

Numerous other objects and advantages will be apparent to those skilled in the art upon reading the accompanying specification, claims and drawings:

In the drawings:

Figure 1 is an elevational view with parts broken away to show details of construction of a device embodying the present invention by which the methods of the present invention may be carried out.

Figures 2 to 7 inclusive, are reduced size elevational views of the apparatus shown in Figure 1, showing the manipulation of the apparatus into different positions during the different stages in the practice of the methods of the present invention.

For example, in Figure 1, valves 8, 9 and 10 are open, gages 11 and 12 read zero, mercury level 13 is at graduation 0 in the large receptacle 14 and at the zero graduation of the small receptacle 15 and there is no core in the enlarged portion 16 of receptacle 15. The graduation divisions in the drawing on receptacles 14 and 15 are calibrated so that equal volumes are represented by each graduation. Obviously this is not essential to the operation of the device since different volume graduations would work equally well by multiplying either by a calibration constant to make the units equal.

Figure 2 is unchanged from Figure 1, except that container 14 has been raised until mercury level 17 has risen to the top of lip 18 of valve 10 with the result that the level of mercury at 14 has fallen to graduation 7.

Figure 3 is exactly the same as Figure 1, except a core or sample of consolidated matter 19 has been placed in chamber 16. Note that mercury level 0 is the same as in Figure 1 which is unnecessary unless it is desired to check against mercury loss.

In Figure 4, the mercury level 20 has been returned to the top of lip 18, but due to the presence of core 19, mercury level 20 is at graduation 4 of receptacle 14.

In Figure 5, the apparatus has been returned to position of Figure 3 and has the same mercury level 13, but it will be noted that valve 10 has now been closed while in the position of Figure 3.

The positions shown in Figures 1 to 5 inclusive are common to both method species of the invention. From the position of Figure 5 the apparatus may be moved into that of Figure 6 to practice method "A." Or the apparatus may be moved from the position of Figure 5 into that of Figure 7 to practice method "B." In reaching Figure 6 from Figure 5 it will be noted that valve 9 has been closed, that a gas line 21 has been attached to inject gas under double atmospheric pressure into the top of receptacle 14, that receptacle 14 has been adjusted in height until a common mercury level 22 has been established which in the example shown reads 2.3 on the graduations of receptacle 14, and 2.3 on the graduations of receptacle 15. It will be noted that gages 11 and 12 both read one atmosphere of pressure.

To reach the position shown in Figure 7 from Figure 5, it is merely necessary to raise receptacle 14 until the mercury level in 14 is above the mercury level in 15 by an amount equivalent to one atmosphere pressure. In the example shown in Figure 7 the mercury level 23 in receptacle 14 is shown a distance of 760 mm. above the mercury level 24 in receptacle 15 which may be determined by comparison with meter stick 25, and as the operation is assumed to be carried out in this case in an atmosphere pressure of 760 mm. the gage 12 (if present) reads one atmosphere of pressure.

In Figure 1, receptacles 14 and 15 are shown connected by rubber tubing 26 which may be secured in any usual manner such as by wire 27. Obviously the exact form of apparatus employed and exact materials of construction or means of construction may be varied without departing from the invention, and while I have shown a preferred embodiment of the structure it is obvious that any equivalent apparatus will allow the performance of equivalent methods and be within the terms of the present invention.

I have therefore shown receptacle 14 as a cylindrical glass vessel, provided with graduations 28 related to the volume. Vessel 14 has conduits 29, 30 and 31 communicating with the exterior and conduits 29 and 30 are controlled by valves 8 and 9 respectively, while conduit 31 leads into pipe 26. Any suitable pressure responsive means 11 may be used for indicating the pressure in the air space 32 of chamber 14, but for pressure indicating means 11 and 12, I prefer to employ means which do not change the volume of space 32 to any appreciable degree in registering pressure of one atmosphere and, therefore, I preferably employ such a pressure gage as a Bourdon gage in which the tube is liquid filled and pressure transmission between the liquid in the gage and air in space 32 is effected through a flexible diaphragm 33 which results in very little change in the volume of 32. Obviously other known means for measuring pressures of one atmosphere without substantial volume change will be equally valuable in the practice of the invention and even gages involving considerable volume change will be suitable for use in the present invention if it is merely desired to make a more or less rough estimate of the porosity or the volume change of such a gauge is taken into consideration in the calculations.

Receptacle 15 may be a glass thistle tube with a graduated stem 15, the graduations being indicative of the volume in 15. Obviously the exact shape and volume of enlarged top 16 is immaterial as the shape does not enter into the calculations and the volume is found by tests in Figure 2. In order to be able to insert core 19 (and by the term core in this specification, I intend to include any solid or consolidated solid) into portion 16 it is necessary that a portion of 16 be removable. Whether the line of separation between the top and bottom of 16 occurs is immaterial, but I have found the simple structure shown in Figure 1 to be effective.

A washer 34 is threaded on stem 15 and contains holes through which bolts 35 extend. A cover plate 36 is provided with holes for receiving bolt 35 and butterfly nuts may be provided to draw the cover down on 16. A sealing ring or gasket 38 is provided for sealing cover 36 to the top of 16 and obviously care must be exercised between Figures 2 and 3, that the volume of chamber 16 is not changed in replacing top 36 if the highest accuracy is to be maintained. However, as the final result of porosity estimates in oil well drilling is merely indicative of what porosity other untested parts of the formation may have, for most purposes the adjustment of nuts 37 and gasket 38 is not necessarily a delicate operation.

Top plate 36 contains pressure gage 12 and valve seat 18 as it is preferable to so mount them, however they could be worked into the lower portion 16 without departing from the invention.

Valve 10 is supported in cooperative relation with seat 18 by bracket 39 which may be integral with, or attached to top 36 by any suitable means. Thus, when the liquid level reaches the top of the lip 18, the liquid meniscus may be seen from either side of bracket 39.

*Operation*

In order to carry out the methods "A" and "B" mentioned above it is necessary to first calibrate the apparatus with respect to the volume of portion 16. Top 36 is placed on top of 16 in as uniform a manner as possible each time it is attached by observation of the length of the bolt 36 projecting through nuts 37 or other such means. The apparatus is moved from the position of Figure 1 to that of Figure 2 by raising 14 or lowering 15 or both. In practice, it is advisable to construct a board with 15 and 14 slidably mounted thereon and scale 25 also slidably thereon in close enough juxta-position so that comparison of the level may readily be made. However, the method may be practiced without such equipment.

In Figure 2, 14 has been raised relative to 15, as in Figure 1, so that mercury level 13, of Figure 1, has now reached level 17 which is level with the top of lip 18. Obviously the difference between graduation 0 and 7 of 14 is equivalent to the volume of zero mark on 15 to the top of lip 18.

Once this volume of 16 has been determined the operations shown in Figures 1 and 2 need not be repeated unless desired.

The two methods "A" and "B" may therefore be said to start in Figure 3 when core 19 is inserted in portion 16 by removing cover 36 and replacing it. For purposes of convenience, mercury level 13 is shown the same as in Figure 1, but obviously any other mercury level may be employed. The operator notes down the value of mercury level 13, or may wait until the position of Figure 5 is reached before noting down the value. Preferably the values in Figures 3 and 5 are both noted as a check on the proper operation of the device, but either measurement is sufficient. Until valve 10 is closed, it makes little difference where mercury level 13 is recorded, but at the time valve 10 is closed it is preferable to have mercury level 13 rather low in tube 15 so that room for the complete advance of the mercury is provided in tube 15 to the position shown in Figure 6 or Figure 7.

Core 19 having been inserted in Figure 3, it is then necessary to determine the exterior volume of the core which is done by raising 14 relative to 16 as shown in Figure 4. Mercury does not readily enter the pores in cores and the slight mercury head between 18 and 19 is insufficient to overcome the surface tension of the mercury which surface tension keeps the mercury out of the pores of core 19. Therefore, the difference in reading of volume in chamber 14 between that of Figure 2 and Figure 4 is the exterior of volume of the core without relation to its pores.

Receptacle 14 is lowered relative to 16 into a position such as shown in Figure 5 and the level 13 is noted in chamber 14 and 15. While for the convenience of operation level 13 would probably be selected the same as in Figure 3 it is not necessarily the same. Valve 10 is then closed.

*Final operation of method "A"*

If it is desired to follow method "A" a tube 21 from a source of gas pressure preferably slightly more than one atmosphere above atmospheric pressure is attached at 29 and by manipulating valves 8 and 9, observing gages 11 and 12, and leveling the mercury at 22 (by raising or lowering receptacle 14 relative to 15) the state of equilibrium shown in Figure 6 is readily obtained. It will be obvious that in Figure 6, one of gages 11 or 12 is enough because mercury level 22 will only be the same in both 14 and 15 when the pressure in space 32 equals that in 16. As gage 12 might have more effect by varying the volume of chamber 16 to cause an improper reading it is desirable (if only method "A" is to be used) to eliminate gage 12 completely. In such case tube plate 36 is merely made without any hole for gage 12 and the measurement in 36 may be made with gage 11. However, it is useful to have the device capable of practicing several methods and as gages do not change the volume of 16 by an appreciable amount, when the final results and the uses thereof are considered, gage 12 may remain while practicing method "A."

Obviously to increase the accuracy of the calculations of both method "A" and method "B" it is preferred to have a barometer (not shown) in the vicinity of the present invention and to make the pressure in 32 and 16 in Figure 6 or in 16 of Figure 7 exactly twice the barometric pressure rather than to depend on an arbitrary 760 mm. of mercury. This becomes increasingly important with the altitude at which the test is performed.

*Final operation of method "B"*

In the operation of method "B" everything is the same up to and including Figure 5. Then the operator proceeds from Figure 5 to Figure 7 by merely raising 14 relative to 16 until the difference between mercury levels 23 and 24 is 760 mm. (or whatever number of mm. corresponding to the actual barometer pressure at the vicinity of the test). In such case, gage 12 is again unnecessary and could be eliminated. However an alternative method would be to ignore the distance between 23 and 24 and to rely on the reading of gage 12 to show an increase in pressure of 16 equivalent to the barometric pressure in the vicinity. If desired both meter stick 25 and gage 12 may be employed and one reading checked against the other.

In method "B" gage 11 is generally of no value as space 32 is at atmospheric pressure. However gage 11 could furnish a barometric pressure reading if desired, but it is preferred to get barometric readings from a standard type mercury column barometer (not shown).

In Figure 6, only one gage 11 or 12 is necessary because the common level 22 in 14 and 15 insures that the pressure is the same on both gages 11 and 12. In Figure 7, gage 11 is at atmospheric pressure and gage 12 is at atmospheric pressure plus the pressure of a column of mercury the height of which is measured by scale 25 between 24 and 23, which pressure is easily calculated.

It is possible to combine methods "A" and "B" by putting both high pressure gas in 32 as in Figure 6 and having the mercury level in 14 higher than that in 15 and measuring the distance with 25 as in Figure 7. This is not preferred however, because it is a more complex measurement.

*Use of initial pressure different than atmospheric*

If desired when valve 10 is closed in Figure 5 a pressure other than atmospheric (higher or lower) may be placed in 16 and 14 by adding or subtracting gas respectively through pipe 29, keeping valve 9 and pipe 30 closed and then leveling the liquid at 13. From Figure 5 then either method "A" or "B" may be practiced ending in Figures 6 or 7 respectively. The calculations are the same as with atmospheric pressure provided the pressure in chamber 16 is increased a known fraction such as by doubling the pressure in 16 or tripling it, or other known fraction, and the proper factor related thereto is used.

*Calculations*

The results may be calculated as follows to determine the porosity of core 19:

Let us call the reading of volume of chamber 14 in Figures 1, 3 and 5 $a$ and the level in tube 15 in the same figures $b$. The level in 14 in Figure 2 will be designated as $c$ and in Figure 4 will be $d$. In Figures 6 and 7 the levels in 14 and 15 will be respectively $e$ and $f$ and the distance between 23 and 24 will be $g$. The following simple calculation may then be made using the data shown in the specific example shown in the drawings:

$a=0$ units of tube 14
$b=0$ units of tube 15
$c=7$ units of tube 14
$d=4$ units of tube 14
$e=2.3$ units of tube 14
$f=2.3$ units of tube 15
$g=760$ mm.

Volume of chamber 16 and tube 15 from lip 18 to 0 mark $=(c-a)=c=V$

Volume of chamber 16 and tube 15 from lip 18 to 0 mark with core in place $=(d-a)=G=d$ Volume of core 19 (solids and ineffective pores + effective pores) $=(c-a)-(d-a)=(c-d)=V-G=C$ Volume of solids and ineffective pores in core $19=S$ Volume of effective pores in core $19=P$ Now since in Figures 6 and 7 the pressure in chamber 16 has been exactly doubled the gas volume around the core and in the effective pore space has been reduced by ½ its volume.

This then means that the gas volume in 16 around core and in the effective pores, $R = 2(e-a)$ or $2(f-b) = 2e$ or $2f$.

Of course if the pressure is tripled instead of being doubled then instead of $R=2(e-a)$ then $$R = \frac{3}{2}(e-a)$$

and similarly for other values.

The volume of effective pore space P now becomes $R - G = 2(e-a) - (d-a) =$
$\quad 2(f-b) - (d-a) = 2e-d$ or $2f-d$.

The volume of the solids and ineffective pore space S in core 19 becomes $V - R = C - P = (c-a) - 2(e-a) =$
$\quad (c-a) - 2(f-b) = c - 2e = c - 2f$.

Referring to sample calculations we have—

$V = c - a = 7 - 0 = 7$ units
$G = d - a = 4 - 0 = 4$ units
$C = V - G = 7 - 4 = 3$ units
$R = 2(e-a) = 2(2.3-0) = 4.6$ units
$R = 2(f-b) = 2(2.3-0) = 4.6$ units
$P = R - G = 4.6 - 4 = .6$ unit Per cent effective porosity $= \dfrac{100P}{C} = \dfrac{100 \times .6}{3} = 20\%$

Operation of method "C"

As an alternate method of operation valve 10 can be closed when apparatus is in position shown in Figure 4 and then lower vessel 14 to a position where the liquid level in 15 stands at 0. Now by means of the stationary meter stick measure the difference in levels of liquid in the two receptacles. In this position and as a result of the preceding maneuver the gas trapped in the effective pore space in position of Figure 4 is expanded to the volume in chamber 16 and 15 around the core, plus the effective pore space itself. This resulting reduced pressure in chamber 16 is represented by the barometer reading $g$ minus the difference in liquid level reading as determined on the meter stick and which will be herein designated as distance $h$. For the sample conditions set up herein $h = 760$ mm. and therefore this pressure would be $760 - 660.87 = 99.13$ mm. of mercury. But the final expanded volume by inspection is $G+P$ so by fundamental pressure volume relationships $760P = (760 - 660.87)(G+P)$ or $$760P = 99.13G + 99.13P.$$

G however has ben determined to be 4.00 units, hence $760P - 99.13P = 396.52$ and $$P = \frac{396.52}{660.87} = 0.60$$

Then

Per cent porosity $= \dfrac{100 \times .6}{C} = \dfrac{100 \times .6}{3} = 20\%$ Obviously other means of calculating percent porosity may be used based on the above measurements without departing from the invention claimed.

Obviously wide changes in the construction of the apparatus may be made within the scope of the present invention provided the general elements are provided and changes in the sequence in the method may occur without departing from the invention the scope of which is defined in the following claims.

Having described my invention, I claim:

1. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, fluid pressure responsive means indicating the gage pressure in said first chamber, a second graduated chamber, a flexible conduit connected to said first and second chambers whereby an operator may quickly vary the relative elevations of said chambers and providing communication between said chambers, said second chamber having an air inlet and an air outlet, a valve disposed to open and close said air inlet, a valve disposed to open and close said air outlet, fluid pressure responsive means indicating the gage pressure in said second chamber and a liquid test medium in said chambers and said flexible conduit.

2. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, a second graduated chamber, a flexible conduit connected to said first and second chambers whereby an operator may quickly vary the relative elevations of said chambers and providing communication between said chambers, said second chamber having an air inlet and an air outlet, a valve disposed to open and close said air inlet, a valve disposed to open and close said air outlet, fluid pressure responsive means indicating the gage pressure in said second chamber and a liquid test medium in said chambers and said flexible conduit.

3. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, fluid pressure responsive means indicating the gage pressure in said first chamber, a second graduated chamber, a flexible conduit connected to said first and second chambers whereby an operator may quickly vary the relative elevations of said chambers and providing communication between said chambers, fluid pressure responsive means indicating the gage pressure in said second chamber and a liquid test medium in said chambers and said flexible conduit.

4. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, fluid pressure responsive means indicating the gage pressure in said first chamber, a second graduated chamber, a flexible conduit connected to said first and second chambers whereby an operator may quickly vary the relative elevations of said chambers, and second chamber having an air inlet and an air outlet, a valve disposed to open and close said air inlet, a valve disposed to open and close said air outlet and a liquid test medium in said chambers and said flexible conduit.

5. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, a second graduated chamber, a flexible conduit connected to said first and second chambers whereby an operator may quickly vary the relative elevations of said chambers and providing communication between said chambers, fluid pressure responsive means indicating the gage pressure in said second chamber and a liquid test medium in said chambers and said flexible conduit.

6. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, a second graduated chamber, a flexible conduit connected to said first and second chambers whereby an operator may quickly vary the relative elevations of said chambers and providing communication between said chambers, said second chamber having an air inlet and an air outlet, a valve disposed to open and close said air inlet, a valve disposed to open and close said air outlet and a liquid test medium in said chambers and said flexible conduit.

7. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, fluid pressure responsive means indicating the gage pressure in said first chamber, a second graduated chamber, a flexible conduit connected to said first and second chambers whereby an operator may quickly vary the relative elevations of said chambers and providing communication between said chambers and a liquid test medium in said chambers and said flexible conduit.

8. An apparatus for testing porosity comprising in combination a first graduated chamber having a removable and replaceable wall portion for the insertion of a sample the porosity of which sample is to be tested, said first chamber having an orifice in its uppermost portion disposed and constructed so as to be visible from outside said apparatus whereby an operator can see when any liquid in said apparatus is brimming said orifice, a valve disposed to open and close said orifice without changing the total internal volume of said apparatus, a second graduated chamber, a flexible conduit connected to said first and second chambers whereby an operator may quickly vary the relative elevations of said chambers and providing communication between said chambers and a liquid test medium in said chambers and said flexible conduit.

9. The method of measuring the porosity of a sample having relatively small pores comprising the steps of placing the sample in an open chamber of known volume, flooding the chamber around said sample with a measured amount of a liquid having sufficient surface tension to prevent the liquid entering said pores, and thereby measuring the volume of said sample including said pores, lowering the liquid level to a measured first level in said chamber below said sample, closing said chamber, forcing additional liquid into said chamber to a second level above said first level but below the level of said sample, and determining the gage pressure in said chamber and the volume of liquid between said first level and said second level, from which steps the porosity of said sample is readily calculated.

10. The method of measuring the porosity of a core which comprises determining the bulk volume of a core by immersion thereof in a test liquid to which the core is impermeable and measuring displacement of the test liquid by the core, replacing the liquid surrounding the core with a gas to which the core is permeable while maintaining contact between said liquid and said gas, and applying pressure to the gas through said liquid to produce a decrease in gas volume which is representative of the volume of core material exclusive of the volume of pores therein which communicate with the core surface.

GLEN G. HEBARD.

REFERENCES CITED

The following references are of record in the file of this patent:

UNITED STATES PATENTS

| Number | Name | Date |
|---|---|---|
| 2,293,488 | Bays | Aug. 18, 1942 |
| 2,296,852 | Horner | Sept. 29, 1942 |
| 2,323,556 | Mattocks | July 6, 1943 |
| 2,401,101 | Pockman | May 28, 1946 |